US007920944B2

(12) United States Patent
Gould et al.

(10) Patent No.: US 7,920,944 B2
(45) Date of Patent: Apr. 5, 2011

(54) VEHICLE DIAGNOSTIC TEST AND REPORTING METHOD

(75) Inventors: Garett W. Gould, Troy, MI (US); Gregory S. McLaurin, Novi, MI (US)

(73) Assignee: General Motors LLC, Detroit, MI (US)

( * ) Notice: Subject to any disclaimer, the term of this patent is extended or adjusted under 35 U.S.C. 154(b) by 843 days.

(21) Appl. No.: 11/163,538

(22) Filed: Oct. 21, 2005

(65) Prior Publication Data

US 2007/0093947 A1 Apr. 26, 2007

(51) Int. Cl.
*B60G 17/0185* (2006.01)
*B60Q 1/00* (2006.01)
*G01M 17/00* (2006.01)

(52) U.S. Cl. ........... 701/33; 701/29; 701/35; 340/425.5; 340/438; 340/523

(58) Field of Classification Search .................... 701/29, 701/1, 33, 35; 704/270, 274; 455/412.1; 340/426.14, 438, 457, 523, 945, 425.5; 702/183, 702/185
See application file for complete search history.

(56) References Cited

U.S. PATENT DOCUMENTS 4,933,852 A 6/1990 Lemelson
5,442,553 A 8/1995 Parrillo
5,491,631 A 2/1996 Shirane et al.
5,541,840 A 7/1996 Gurne et al.
5,555,498 A 9/1996 Berra et al.
5,916,286 A 6/1999 Seashore et al.
6,008,723 A * 12/1999 Yassan .......................... 340/438
6,025,776 A 2/2000 Matsuura
6,028,537 A 2/2000 Suman et al.
6,181,992 B1 1/2001 Gurne et al.
6,265,988 B1 7/2001 LeMense et al.
6,330,499 B1 * 12/2001 Chou et al. ....................... 701/33
6,362,730 B2 3/2002 Razavi et al.
6,415,210 B2 7/2002 Hozuka et al.
6,470,288 B1 10/2002 Keidel et al.
6,526,529 B1 * 2/2003 Miksovsky et al. ............. 714/57
6,580,916 B1 6/2003 Weisshaar et al.
6,662,091 B2 12/2003 Wilson et al.
6,671,757 B1 12/2003 Multer et al.

(Continued)

OTHER PUBLICATIONS

Kelly Carroll, Data to ride shotgun: InfoMove Helps Connect Cars to Internet, Telephony Dec. 13, 1999, Copyright 1999 by Primedia Business Magazines & Media Inc. "All Rights Reserved", Telephony Spectrum; ISSN: 0040-2656, 1091 words.

(Continued)

*Primary Examiner* — Thomas G Black
*Assistant Examiner* — Christine Behncke
(74) *Attorney, Agent, or Firm* — Anthony L. Simon; Reising Ethington P.C.

(57) ABSTRACT

A system and method for providing user-initiated vehicle diagnostic testing and reporting in a telematics-enabled vehicle. In the method, a request for a vehicle diagnostic test is received from the driver through a user interface of a telematics unit on the vehicle. A simplified initial diagnostic check is made and a first voice message is played for the driver that provides information concerning any detected vehicle problem. The method then undergoes a more complete diagnostic check and the resulting diagnostic information is used to select and play a second voice message that provides instructions for taking corrective action to fix the detected problem. Communication with a live advisor is also provided by way of a cellular or other wireless carrier system.

16 Claims, 3 Drawing Sheets

U.S. PATENT DOCUMENTS

| | | | | |
|---|---|---|---|---|
| 6,735,503 | B2 | 5/2004 | Ames | |
| 6,745,151 | B2 * | 6/2004 | Marko et al. | 702/182 |
| 6,799,101 | B2 | 9/2004 | Hawig et al. | |
| 6,807,469 | B2 | 10/2004 | Funkhouser et al. | |
| 6,819,236 | B2 | 11/2004 | Kawai et al. | |
| 6,842,676 | B2 | 1/2005 | Rodriguez | |
| 6,847,872 | B2 * | 1/2005 | Bodin et al. | 701/33 |
| 6,956,501 | B2 | 10/2005 | Kitson | |
| 6,957,133 | B1 * | 10/2005 | Hunt et al. | 701/29 |
| 6,993,421 | B2 * | 1/2006 | Pillar et al. | 701/33 |
| 7,007,041 | B2 | 2/2006 | Multer et al. | |
| 7,085,680 | B2 | 8/2006 | Huang | |
| 7,092,803 | B2 | 8/2006 | Kapolka et al. | |
| 7,209,813 | B2 | 4/2007 | Namaky | |
| 7,272,475 | B2 | 9/2007 | Gawlik et al. | |
| 7,286,047 | B2 | 10/2007 | Oesterling et al. | |
| 7,302,371 | B2 | 11/2007 | Oesterling et al. | |
| 7,400,954 | B2 | 7/2008 | Sumcad et al. | |
| 7,522,979 | B2 * | 4/2009 | Pillar | 701/33 |
| 2002/0007237 | A1 | 1/2002 | Phung et al. | |
| 2002/0033843 | A1 | 3/2002 | Loos et al. | |
| 2002/0183904 | A1 | 12/2002 | Sakurai et al. | |
| 2003/0009270 | A1 | 1/2003 | Breed | |
| 2003/0041125 | A1 | 2/2003 | Salomon | |
| 2003/0114965 | A1 | 6/2003 | Fiechter et al. | |
| 2003/0137194 | A1 * | 7/2003 | White et al. | 307/10.1 |
| 2004/0267410 | A1 | 12/2004 | Duri et al. | |
| 2005/0060124 | A1 | 3/2005 | Chen et al. | |
| 2005/0065678 | A1 | 3/2005 | Smith et al. | |
| 2005/0068174 | A1 | 3/2005 | Oesterling et al. | |
| 2005/0108065 | A1 | 5/2005 | Dorfstatter | |
| 2005/0108249 | A1 | 5/2005 | Schalk et al. | |
| 2005/0154500 | A1 | 7/2005 | Sonnenrein et al. | |
| 2005/0156715 | A1 | 7/2005 | Zou et al. | |
| 2005/0187680 | A1 | 8/2005 | Kamdar et al. | |
| 2006/0247832 | A1 * | 11/2006 | Taki | 701/33 |

OTHER PUBLICATIONS

Seattle, InfoMove Delivers New Generation of Wireless Internet Services for the Car, Business Wire, Oct. 18, 1999, Copyright 1999 Business Wire, Inc., Business Wire, Business Editors/Technology Writers, 994 words.

Bob Low, Motoring in the New Millennium on the Net, Daily Record, May 1, 1998, Copyright 1998 Scottish Daily Record & Sunday Mail Ltd., Daily Record May 1, 1998, Friday, p. 31 Road, 734 words.

Tarre Beach, New Products; Sidebar, Wireless Review Apr. 1, 2000, Copyright 2000 by Primedia Business Magazines & Media Inc., “All Rights Reserved” Wireless Review, Apr. 1, 2000, New Products; ISSN: 1099-9248, 351 words.

Flint, Mich., Jan. 3, BUIC XP-2000—A Concept Car for the 21st Century, PR Newswire, Jan. 3, 1995, Copyright 1995 PR Newswire Association, Inc. PR Newswire, Jan. 3, 1995, Tuesday, Financial News, (With Photo) To Business and Auto Editors, 2149 words.

* cited by examiner

| DTC | VM1 | VM2 |
|---|---|---|
| P0100 | VM0100-1 | VM0100-2 |
| P0101 | VM0100-1 | VM0101-2 |
| ●●● | ●●● | ●●● |
| P0804 | VM0804-1 | VM0804-2 |

VEHICLE DIAGNOSTIC TEST AND REPORTING METHOD

TECHNICAL FIELD

The invention generally relates to vehicle diagnostics and, more specifically, to diagnostic testing and reporting of operating conditions or servicing needs of a vehicle.

BACKGROUND OF THE INVENTION

Automobiles often include self-diagnostic capabilities to detect problems that affect engine performance, emissions, braking, and other computer controlled or monitored vehicle systems. For example, when a vehicle control module associated with a vehicle system, circuit, or component detects a fault or sensor reading outside an acceptable predefined range, the control module may generate an alphanumeric diagnostic trouble code that identifies the fault and that may be saved as diagnostic data to memory in a vehicle computer. When certain diagnostic trouble codes are received by the vehicle computer, the computer will illuminate a warning indicator light within the vehicle, such as the widely used malfunction indicator light (MIL), better known as the "Check Engine" light, which provides a general indication that there is a problem with the vehicle. But such indicator lights may provide little or no value to a vehicle driver in determining the potential seriousness of any given problem and no directions or assistance are given on how to remedy the potential problem. Some vehicles are equipped to perform a diagnostic check and then display trouble codes, but this information is also of limited usefulness to a driver who is not familiar with the meaning of such codes. Another existing system provides a textual display instead of trouble codes and while this provides additional information to the vehicle driver, it requires the driver to divert his or her visual attention to the textual display and can be limited in its ability to assist the driver in taking remedial action to fix the problem.

In other existing vehicle diagnostic implementations, diagnostic information may be extracted from the vehicle computer by a service technician. For example, the service technician can place the vehicle computer into a diagnostic mode by grounding certain terminals on a diagnostic connector of the onboard computer, thereby causing the "Check Engine" light or other indicator lights to blink or otherwise display the specific fault code associated with the potential problem. In another example, a service technician may plug an electronic diagnostic scan tool into the diagnostic connector of the onboard computer to access and read fault codes in detail. In either case, the diagnostic trouble codes may be extracted but must be completed by a service technician using only a direct, physical connection to the vehicle.

More recently, other methods have been developed to provide remote analysis and communication with the vehicle and its diagnostic system using a live advisor. Such services are available for vehicles equipped with a factory-supplied, built-in cellular or other wireless communication system. Using this service, limited diagnostic information is supplied to the live advisor who can them give the vehicle user a recommendation as to how soon they need to take their vehicle in for servicing. This system can also be used to automatically communicate with a central call center in the event that the vehicle system detects certain events, such as a deployment of the vehicle airbags or other safety system.

SUMMARY OF THE INVENTION

In accordance with one aspect of the invention, there is provided a diagnostic test and reporting method for a vehicle having an onboard diagnostic system and a telematics unit that communicates with the diagnostic system. The method includes the steps of:

(a) receiving a request for a vehicle diagnostic test from a vehicle user through a user interface of the telematics unit;

(b) obtaining diagnostic status information from the diagnostic system in response to the request;

(c) accessing a pre-recorded voice message associated with the diagnostic status information; and (d) playing the pre-recorded voice message for the vehicle user.

If desired, the method can also include the following additional steps:

(e) performing a vehicle diagnostic check of various vehicle conditions and generating diagnostic data resulting from the diagnostic check;

(f) accessing a second pre-recorded voice message associated with the diagnostic data, the second voice message containing one or more instructions concerning corrective action to be taken by the vehicle user; and (g) playing the second pre-recorded voice message for the vehicle user.

In accordance with another aspect of the invention, there is provided a diagnostic test and reporting method for a vehicle having an onboard diagnostic system, an instrument panel display containing at least one warning light or other visual indicator connected to the diagnostic system to provide a visual warning to a vehicle user, and a telematics unit that communicates with the diagnostic system and enables voice communication between the vehicle user and a live advisor via a wireless connection. The method includes the steps of:

(a) receiving a request for a vehicle diagnostic test from the vehicle user through a user interface of the telematics unit;

(b) determining whether a visual warning is present on the instrument panel display and, if so, accessing and playing a pre-recorded voice message that provides information concerning the visual warning;

(c) performing a vehicle diagnostic check of various vehicle conditions and generating diagnostic data resulting from the diagnostic check;

(d) accessing and playing a second pre-recorded voice message associated with the diagnostic data, the second voice message containing one or more instructions concerning corrective action to be taken by the vehicle user; and (e) providing the vehicle user with an option to communicate with the live advisor via voice communication over the wireless connection.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

Figure 1:
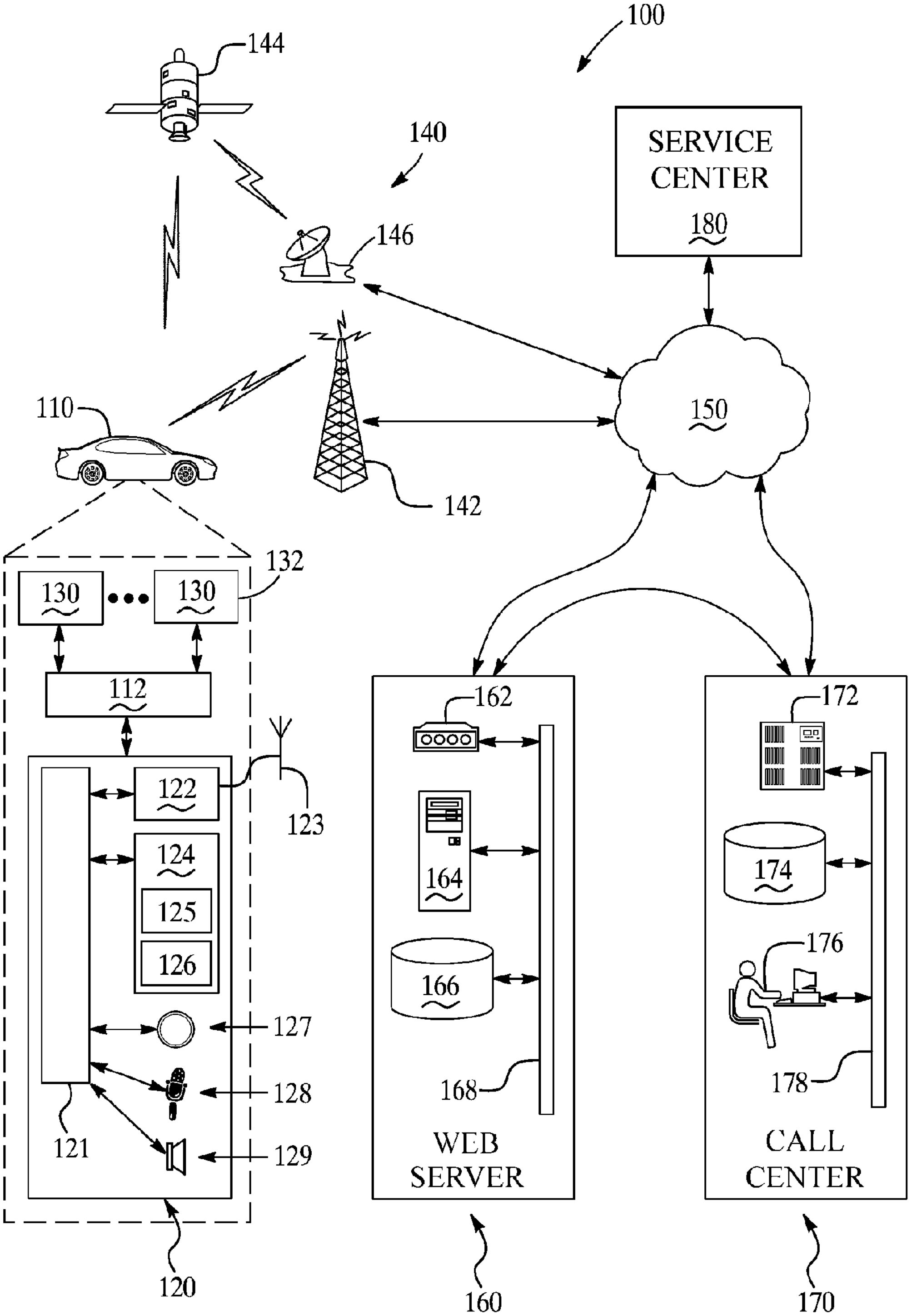
FIG. 1 is a block diagram depicting an example of a mobile vehicle communication system that can be used to implement the method of the present invention.

As seen in FIG. 1, there is shown an operating environment for implementing an embodiment of the method of the present invention. This embodiment utilizes a mobile vehicle communication system (MVCS) 100 which includes a motor vehicle 110, wireless carrier system 140, communication network 150, web server 160, call center 170, and vehicle service center 180. As will be described farther below in connection with FIG. 4, the particular embodiment of the inventive method described herein involves conducting various diagnostic checking and reporting within the vehicle 110, with the reporting being carried out by way of voice messages audibly played for the vehicle driver to provide information and instructions concerning various vehicle diagnostic and operating conditions. The method also enables the driver to initiate wireless voice communication with either a live advisor at the call center 170 or a service technician or scheduler (not shown) at the service center 180. The system can also communicate electronically with the web server 160 for various purposes such as obtaining updated voice messages. These features will be described in greater detail farther below.

Motor vehicle 110 is depicted in the illustrated embodiment as a typical passenger sedan, and it will be appreciated that other mobile vehicles such as marine vehicles, aircraft, and other automobiles (e.g., vans, gas and diesel trucks, etc.) can be used without departing from the scope of the invention. Located within vehicle 110 are various electronic modules that include a telematics unit 120 connected by way of a on-board vehicle network 112 to one or more vehicle system modules (VSMs) 130. As will be described in greater detail, telematics unit 120 provides communication and interactivity with the driver and with various remote locations including web server 160, call center 170, and service center 180. The VSMs 130 provide various on-board vehicle diagnostic, monitoring, control, and reporting functions. For example, one VSM 130 can be used for controlling engine operation (e.g., fuel injection and ignition timing), while another VSM 130 can be a safety system that handles monitoring and deployment of air bags or other SIR safety systems on the vehicle. In the embodiment of FIG. 1, the VSMs include a diagnostic VSM 132, such as an on-board diagnostic system (e.g., an OBD-II system) which performs a diagnostic check of various vehicle sensors. This will be described in greater detail in connection with FIG. 2.

In facilitating interactions among the various communication and electronic modules, vehicle communication network 112 uses any suitable network communication approaches, such as controller-area network (CAN), ISO Standard 9141, ISO Standard 11898 for high-speed applications, ISO Standard 11519 for lower speed applications, SAE Standard JI 850 for high-speed and lower speed applications, and/or the like.

Telematics unit 120 can be implemented in various ways, but in the illustrated embodiment includes a processor 121, a communications device 122 for wireless communication to and from the vehicle via one or more antennas 123, a digital memory 124 which stores programs 125 and a database 126, one or more pushbutton switches 127 and a microphone 128 for user input to the telematics unit, and one or more speakers 129 for providing voice messages and other audible information and/or feedback to the vehicle user. Processor 121 can be implemented in various ways known to those skilled in the art, such as by a microprocessor or an application specific integrated circuit (ASIC). Processor 121 executes one or more computer programs 125 to carry out its various functions of monitoring and processing data and communicating with the vehicle system modules 130, vehicle user, and remote locations.

Communications device 122 provides wireless communication via cellular (e.g., CDMA, GSM), satellite, or other wireless path, and includes the ability to provide for both voice and data communications. This allows data communication with at least the web server 160, as well as voice and, if desired, data communication with the call center 170 and service center 180.

Memory 124 can any digital storage device that provides computer-readable storage of data and programs for use by processor 121. This includes volatile and/or non-volatile memory storage and can be implemented as one or more separate physical devices.

Programs 125 include one or more computer programs that are executed by processor 121 to carry out the various functions of telematics unit 120. The database 126 includes storage of the voice messages and associated diagnostic trouble codes or other diagnostic information, as will be described below. This database can be stored as database tables that enable lookups to be performed on the data stored in the database, and this can be done using known indexing techniques and/or database queries, or by straight serial searching through the tables. These and other database storage and lookup techniques are known to those skilled in the art.

The pushbutton 127 enables user-activation of one or more functions of the telematics unit 120. This switch 127 can be a typical OnStar® switch located within the vehicle in reach of the driver. In addition to being used in a conventional fashion for voice communication with a live advisor at the call center 170, the switch 127 can be used to initiate the diagnostic checking and reporting method discussed below in connection with FIG. 4. Similarly, microphone 128 permits the vehicle driver to provide voice commands to the telematics unit 120, as well as voice communication with various remote locations via the communications device 122. Voice commands from the user can be interpreted using processor 121 and a voice recognition program stored within the memory 124. Alternatively, a dedicated digital signal processor (DSP) or other module can be provided for this function. Voice recognition programs and interfaces to other electronic modules are known to those skilled in the art.

The speaker 129 can be one or more dedicated speakers or can be one or more of the same speakers used by the vehicle radio or other infotainment system (not shown). The speaker 129 is used to supply audible voice messages from the telematics unit to the vehicle occupants using either stored audio files or synthesized speech. The speaker can also be used along with the microphone 128 for providing the driver with voice communication to the call center 170, service center 180, or for other general purpose telephony services.

Although depicted in FIG. 1 as separate individual modules, it will be appreciated by those skilled in the art that many of the components of telematics unit 120 can be integrated together, or integrated and/or shared with other vehicle systems so that, for example, memory 124 can be incorporated into processor 121 or located outside of telematics unit 120 and shared with one or more other vehicle systems.

Wireless carrier system 140 can be a cellular and/or satellite wireless communication system used to transmit voice and data between the vehicle 110 and various remote locations such as shown in FIG. 1. In one embodiment, wireless carrier system 140 is implemented as a CDMA, GSM or other cellular communication system 142 that exchanges voice and data between the vehicle 110 and communication network 150. Additionally or alternatively, wireless communication can be by way of satellite transmission which uses one or more satellites 144 to connect the vehicle to the communication network 150 via, for example, a central, ground-based satellite facility 146. Communication network 150 can be a land-based wired system such as the public telephone system and/or cable system used for telephony and data communication including communication that is carried out over the Internet.

The web server 160 can be implemented using one or more computer servers located either at an independent remote location or, for example, at the call center 170. A typical server is shown in FIG. 1 and includes a modem and/or router 162, a computer 164, and database 166 all connected by an Ethernet LAN 168. Database 166 can be implemented using a separate network attached storage (NAS) device or can be stored on a computer 164 itself, or can be located elsewhere, as desired. The computer 164 has a server application program that controls the exchange of data between the vehicle 110 and database 166 via the network 150. Web server 160 can also communicate with call center 170 and/or service center 180 either via network 150 or by some more direct path. Suitable server hardware and software configurations are known to those skilled in the art.

Call center 170 can be one or more locations staffed by one or more live advisors 176 who handle calls from vehicle drivers and/or who monitor for various vehicle conditions such as an airbag deployment. The call center can include one or more servers 172 that include the necessary communication capabilities with network 150, data storage 174, and a LAN 178 for connecting these components together along with the computer(s) used by the live advisors 176. If desired, the web server 160 can be integrated into call center 170 rather than utilizing two separate systems. Suitable call center facilities are known and currently in use to provide remote live assistance in connection with in-vehicle safety and security systems. Apart from using live advisors, the advisor 176 can be implemented as an automaton or a program running on a computer operatively disposed to respond to subscriber requests.

Service center 180 can be a vehicle service center such as a dealership where vehicle maintenance and repair is carried out. The service center is connected by way of communication network 150 with the vehicle 110 so that the driver can initiate a telephone call with a technician or service scheduler at the service center.

Figures 2, 3:
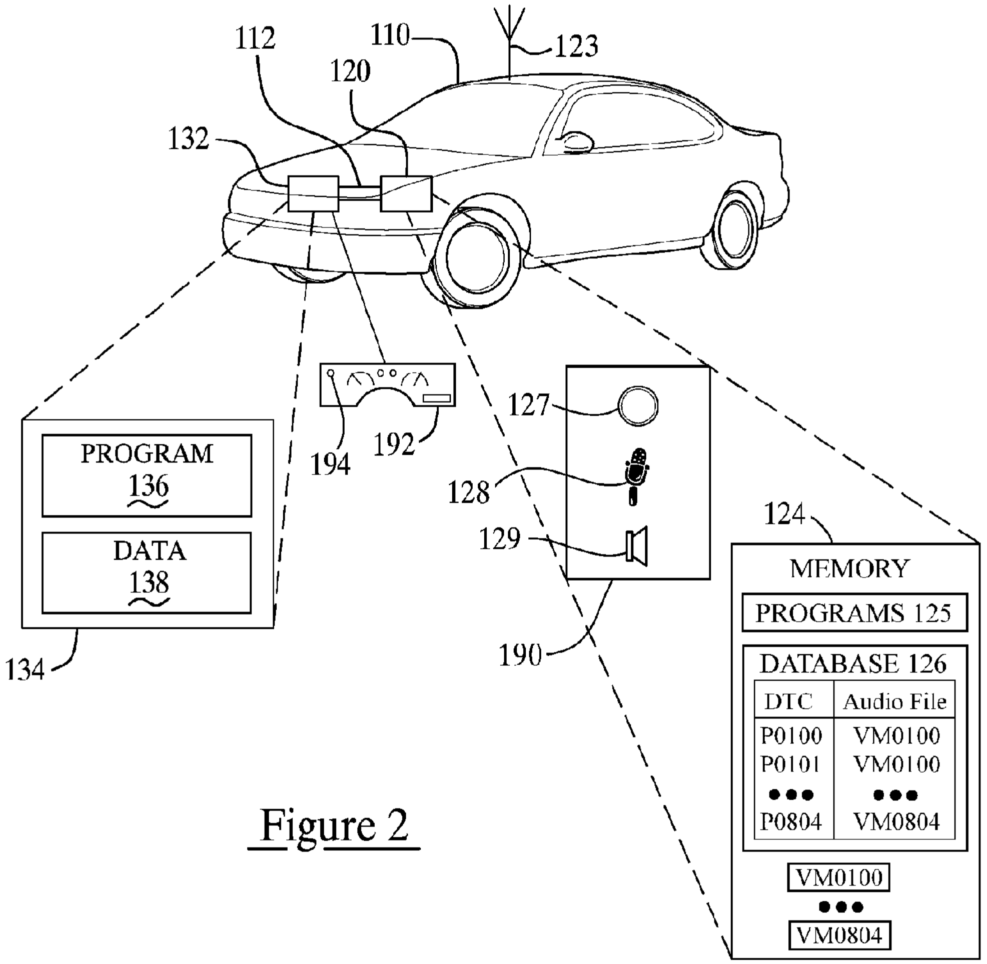
FIG. 2 is a block diagram showing further details of the vehicle-based telematics unit and on-board diagnostic system used in the mobile vehicle communication system of FIG. 1.
FIG. 3 is a diagrammatic view of an alternative embodiment of a database that can be used in lieu of that shown in FIG. 2.

Referring now to FIG. 2, further details of the construction and use of telematics unit 120 and diagnostic VSM 132 will now be described. As in FIG. 1, telematics unit 120 is connected to the diagnostic system 132 via the vehicle network 112. Of course, a dedicated connection could be used in lieu of network 112 or the telematics unit and diagnostic system could be integrated together into a single module. Telematics unit 120 includes the memory storage 124 for both programs 125 and database 126. It also includes a user interface 190 that has switch 127, microphone 128, and speaker 129 to enable communication and signaling with the driver. Diagnostic module 132 can be constructed in the same or similar manner as telematics unit 120 (i.e., using a processor and interface electronics for connecting to the network 112), and it also includes memory storage 134 for one or more programs 136 and data 138. Diagnostic system 132 is connected to the vehicle instrument panel 192 to enable the use of either a short textual display or one or more indicator warning lights, such as a "Check Engine" light 194. This connection can be direct as shown in FIG. 2 or via the network 112 or by some other path. This allows diagnostic system 132 to activate the light 194 in the event that it detects a fault or other condition requiring driver attention.

In the illustrated embodiment, database 126 includes vehicle diagnostic status information, diagnostic data, and associated voice messages for playback via one or more speakers within the vehicle. As will be disclosed below in connection with the method of FIG. 4, the diagnostic status information is used to determine if there is an existing problem being reported by the diagnostic system 132 whereas the diagnostic data can be provided as a part of a more comprehensive diagnostic check. The diagnostic data can be any data indicative of an operating condition or status of a particular vehicle sensor or other component. Preferably, the diagnostic data comprises standardized diagnostic trouble codes that are written to the database either automatically during continuous or periodic monitoring of various sensors or systems, or can be codes set or received from individual vehicle modules or systems as the result of a specific diagnostic check. The diagnostic status information itself can also be diagnostic data (such as trouble codes) or can be separate information such as a flag or other data that is used to set the state (on or off) of the vehicle's Check Engine or other warning indicator; or, instead can be a separate flag or data that is set under the same or different conditions than is used to illuminate the Check Engine or other warning indicator.

The voice messages can be pre-recorded digital audio files that are stored on board the vehicle, with each voice message being associated with at least some of the diagnostic status information and/or diagnostic data. For example, where the diagnostic status information represents the two-state status of the Check Engine light 194 (on or off), a first set of pre-recorded voice messages stored in the database can be associated with the two possible statuses so that the appropriate first voice message can be played to the driver via the speaker 129 to provide information about the Check Engine light—e.g., what it means when the light is on. Additional information concerning the underlying cause of the light being illuminated can be included as a part of this voice message or can be provided from a supplemental pre-recorded voice message. Thus, in addition to one or more pre-recorded voice messages concerning the status of the instrument panel warning light(s), the database 126 of the illustrated embodiment includes a number of additional pre-recorded voice messages each related to one or more of the diagnostic trouble codes. This second set of (supplemental) voice messages can be used to provide more specific information as well as instructional messages concerning corrective action to be taken by the driver to address the identified fault or other undesired vehicle condition.

In the disclosed embodiment, the database 126 contains at least one table that relates the diagnostic status information and diagnostic data to the various voice messages. This can be done using standard OBD-II trouble codes that are listed in the table along with associated voice message (audio) files. The voice message files can then be stored separately within the memory 124. Thus, telematics unit 120 can play relevant voice messages over the speaker 129 by using one or more diagnostic trouble codes from the diagnostic system 132 to lookup the voice message file associated with that trouble code, and then accesses and plays that voice message from the memory 124. Each trouble code may have one or more of its own separate voice message or some related trouble codes can all share the same voice message (by identifying the same voice message filename in the table), and the system can include a default voice message shared by multiple trouble codes when, for example, the only instruction desired is to tell the driver that the vehicle needs to be taken into a dealership for servicing. As indicated in FIG. 2, the trouble codes can each have a single voice message file associated with that code, with some codes (e.g., P0100-P0104) all sharing the same voice message file. This arrangement is useful where a more generic first voice message is provided to the driver that is not particularized to a single or small group of trouble codes. Alternatively, as shown in FIG. 3, the database can include two voice messages associated with each trouble code, the first set of voice messages (VM1) being used to provide information about the particular problem associated with that trouble code, and the second set of voice messages (VM2) being used to provide further information and/or instructions for taking correcting action to fix the reported problem. In this arrangement, groups of trouble codes will share a more generic first message (VM1) whereas in many instances the second set of voice messages (VM2) will more often be individualized for a particular trouble code. Although shown as being stored in the telematics unit 120, the database 126 and/or voice message files can be instead stored in the diagnostic system 132 or even at a remote location such as database 166 of the web server 160.

When stored as audio files, the voice messages can be stored in any suitable form, such as .wav, .mp3, or other encoded or unencoded formats. The voice messages need not be limited to pre-recorded audio, but can instead by stored, for example, as text or phonetic components that are then used by a synthesized speech processor to produce the audible voice message. Circuitry and techniques for implementing the voice messages as synthesized speech is known to those skilled in the art.

Diagnostic system 132 preferably comprises an OBD-II compliant system which performs a diagnostic check of various vehicle sensors that monitor such things as fuel and air metering, ignition system operation, emissions, vehicle speed and idle control, vehicle computer operation, and the transmission. The diagnostic system 132 is operable to perform the diagnostic check and return one or more diagnostic trouble codes that are sent to the telematics unit 120 and/or stored as diagnostic data 138 for later retrieval by the telematics unit or by a technician via a scanner, or remotely by a diagnostic advisor or even the web server via the antenna 123.

Within the telematics unit 120, the program 125 is operable to receive driver input via user interface 190 (i.e., by way of switch 127 and/or microphone 128). The program 125 can initiate a vehicle diagnostic test by sending a command to the diagnostic system 132 either directly or via the network 112. The program also controls the playback of voice messages to the driver via speaker 129. Using program 125, the telematics unit can receive vehicle diagnostic data (e.g., trouble codes) and/or other information from diagnostic system 132, and the unit 120 handles the transmission of such information to call center 170. The program 125 can also receive data from other vehicle system modules, such as GPS data from an on-board GPS receiver or safety system deployment information from a SIR system controller, and handles transmission of this other data to call center 170 as well.

Figure 4:
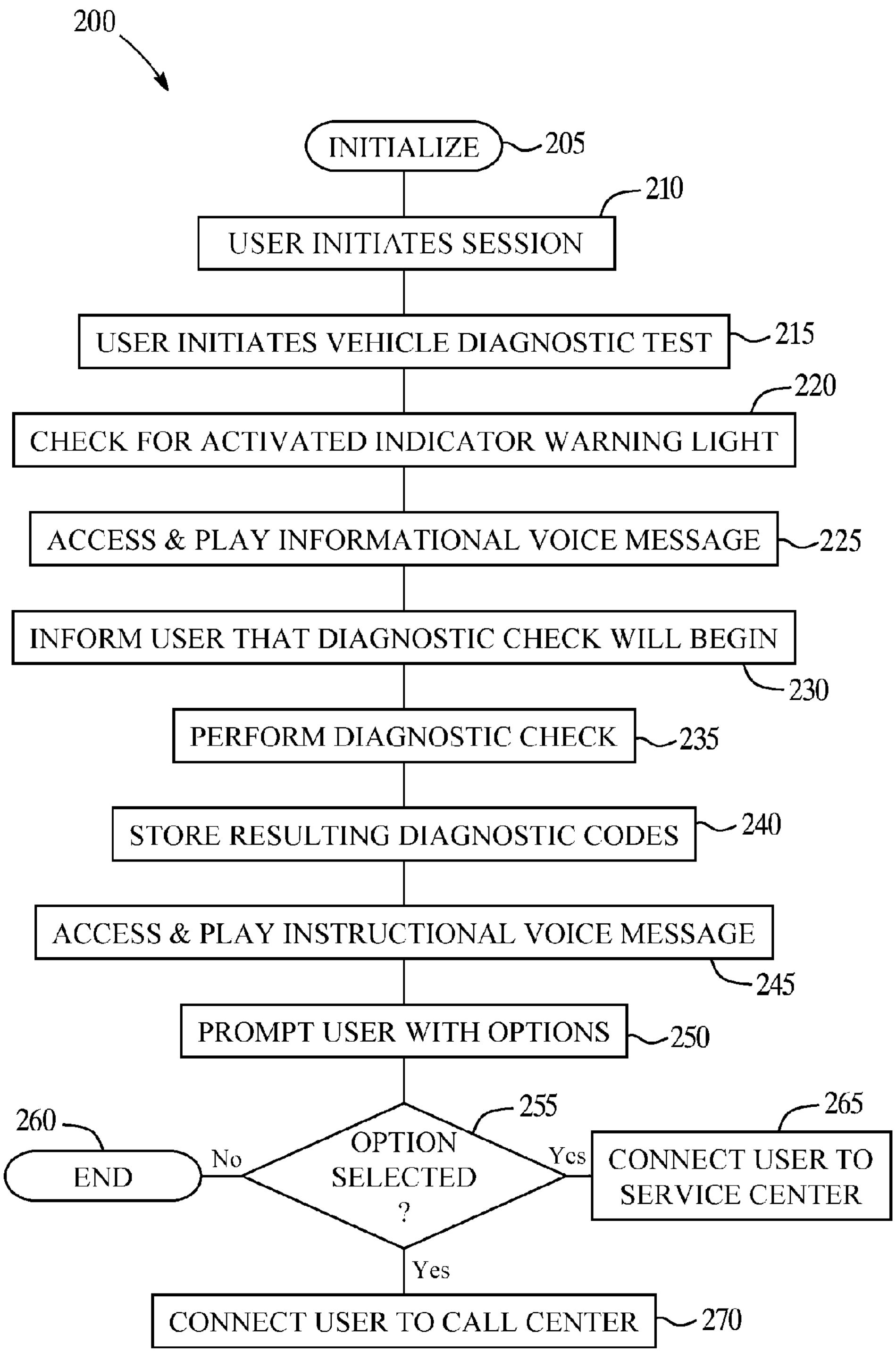
FIG. 4 is a flow chart of an embodiment of a user-initiated diagnostic test and reporting method of the present invention, which can be carried out using the system components of FIGS. 1-3.

FIG. 4 is a flow diagram of one embodiment of a diagnostic test and reporting method for a vehicle. The method 200 is preferably carried out using the systems and concepts detailed in FIGS. 1-3 above. It is, however, contemplated that the method 200 could be deployed in conjunction with any other suitable system and, thus, is not limited to the hardware and software configuration of FIGS. 1-3. The method 200 is preferably carried out under computer control using program 125 that is stored in the memory 124 in computer-readable form.

In FIG. 4, the method 200 begins at step 205 wherein the telematics unit 120 is initialized, such as during vehicle startup or ignition switch activation.

At step 210, a vehicle user interacts with the user interface of the telematics unit 120, preferably by depressing user interface pushbutton 127 to begin a session in which the driver can input voice commands that are interpreted by the telematics unit 120 while operating in a speech recognition mode. Using the speaker 129, the system can acknowledge the pushbutton activation by playing a sound or providing a verbal request for a command from the driver.

At step 215, the telematics unit 120 preferably receives voice input, or further pushbutton input, to request vehicle diagnosis. For example, the telematics unit 120 may receive a voice instruction such as "Check my vehicle" from the driver via the user interface microphone 128.

At step 220, the telematics unit 120 checks for existing diagnostic status information such as by determining if there is an indicator light presently activated. As described above, this can be done by accessing the diagnostic status information which can be previously stored data provided for use by telematics unit 120 or can be a diagnostic trouble code either provided to the telematics unit or stored in the diagnostic system 132. Alternatively, this information can be obtained from an instrument panel display module that controls the various indicators and gauges on the instrument panel 192.

Then, at step 225, the system accesses and plays a pre-recorded informational voice message. The selection of this first voice message is based on whether or not the indicator light is presently activated. Where the Check Engine light is not illuminated, the voice message may simply state that fact by reporting, for example, that "Your vehicle systems have not recently reported any problems." Where there is currently a reported problem, the associated voice message can either be a general message confirming that there is a reported problem or can be a more specific message dependent on the particular diagnostic trouble code being reported. Thus, for example, if DTC P0440 is being reported, the voice message may be: "Your check engine light is currently illuminated. The system that is intended to assure that vehicle emissions are at acceptable levels is reporting a problem and vehicle service is required." The message can also identify the particular trouble code being reported.

To carry out these steps, the processor 121 of the telematics unit 120 can first determine the particular trouble code being reported, and then access the database 126 to look up the associated voice message which it then obtains and plays via speaker 129. This is preferably accomplished within the vehicle 110 using program 125, but may be accomplished off-vehicle as well such as where the database 126 is located remotely at web server 160.

Apart from using OBD-II diagnostic trouble codes, the diagnostic data more generally may include any numbers, letters, alpha-numerics, symbols, other numeric or qualitative values, and/or analog or digital quantities that serve as input for computer processing and that may be assigned some meaning. The diagnostic data may have been generated by a certain condition somewhere within the vehicle 110, such as by a malfunction of, or low-limit or high-limit warnings associated with, a component, sub-system, or system of the vehicle. One example of a condition may be a low coolant condition that causes a coolant level sensor to send a low-limit signal to an engine control module. The engine control module may associate the low-limit signal with a fault code or warning code and store the code or may simply store the signal directly as data. Alternatively, the engine control module may simply store the signal reading as the diagnostic data.

Various other conditions may include high mileage between oil change warning signals and/or associated codes, exhaust emissions faults, or the like. The diagnostic data may also include an absence of fault codes, warnings, or the like. In such a case, diagnostic information may also be associated or correlated with such data or lack thereof, wherein such diagnostic information may be a stored message indicating that all vehicle systems and components are functioning properly.

The first voice message given at step 225 may include raw diagnostic data which has been recorded, classified, organized, related, or interpreted within a framework so that meaning emerges from the raw diagnostic data. More specifically, the voice message may include general or detailed explanations of what the diagnostic data mean, as well as the severity of the diagnostic data. An example of the initial voice message may be that given above for code P0440, and this voice message can be specific to that code or can be used for multiple codes (e.g., P0440-P0455).

After giving the driver an initial report of the known diagnostic status of the vehicle, the system then informs the user that a more complete diagnostic check will begin. This is shown at step 230. For example, the system might playback for the driver a pre-recorded audio message that states: "OnStar will now run a GM Goodwrench Diagnostics Probe on your vehicle." Then, at step 235, the telematics unit 120 sends a command to the diagnostic module 132 to begin the diagnostic check. This diagnostic check can be a standard routine programmed into the diagnostic system 132 that checks each vehicle system module (VSM) 130 or individual sensor that provides diagnostic information and returns the results to the telematics unit in the form of one or more trouble codes. Alternatively, the telematics unit itself can be programmed to probe one or more of the VSMs 130 and/or sensors to obtain the diagnostic data. Thus, rather than waiting for VSMs to carry out predetermined diagnostic routines according to predetermined schedules or frequencies, either the diagnostic system 132 or the telematics unit 120 can actively probe the VSMs, sensors, or the like to run vehicle performance or condition diagnostics. If all systems, circuits, and components probed are operating satisfactorily, then no diagnostic trouble codes or associated diagnostic information are returned in response to the probe. If however, a vehicle system, circuit, or component is experiencing a problem or out of range condition, then the telematics unit 120 will receive one or more trouble codes from the control module or sensor associated with the system, circuit, or component.

It is contemplated that the diagnostic operations may be active or passive. The operations may be passive in that they simply receive signals from modules, sensors, or the like, under current vehicle operating conditions, or may be active in that the diagnostic operations instruct the vehicle to operate in some predetermined fashion and then receive signals from the various modules, sensors, or the like. In any case, the diagnostic operations yield updated diagnostic data that is used to determine the second voice message to be accessed and played to the driver.

At step 240, the received diagnostic trouble code(s), if any, are stored, preferably to the memory 124 of the telematics unit 120, but may be stored in the diagnostic system 132 or in any other suitable memory of the vehicle 110.

Using the received trouble code(s), the system at step 245 then looks up a second voice message from the database 126 and plays it for the driver via speaker 129. This second voice message can provide more detailed information and preferably at least provides the driver with instructions for taking corrective action to address the detected problem. In lieu of a lookup based on the trouble code, the selection of a particular second, instructional voice message may also be determined using the diagnostic fault codes as input to a diagnosis algorithm, wherein the algorithm is designed to determine one or more courses of corrective action. Then, the results of that algorithm are used to select among a number of stored voice messages.

As an example of a possible instructional message for trouble code P0440, the voice message might state: "The powertrain system has detected an emissions system malfunction. If your vehicle has been refueled recently, check the fuel cap for proper installation. Turn to tighten the cap until you hear two clicks. If the check engine light remains on after starting and driving your vehicle seven more times, then your vehicle requires servicing."

At step 250, the vehicle user is given the option of being connected with a live advisor at the call center 170 or with a service center 180. This is again done using a voice message that requests a user response preferably in the form of a voice command. The vehicle user may wish to obtain further information concerning the reported problem and discuss potential corrective action with the live advisor 176. For this purpose, the telematics unit 120 can automatically supply the trouble codes or other diagnostic data to the live advisor 176 via the wireless carrier system 140 and network 150. This allows the live advisor to access additional stored information concerning the reported trouble code. Similarly, this information can be supplied to the service center 180 to aid in determining corrective action or in scheduling for service. Alternatively, the vehicle user may wish to find the nearest service center 180 to have a service technician check out the vehicle. For this purpose, if the vehicle is supplied with GPS capability then this information can be automatically obtained by the live advisor 176 or web server 160 and used to identify one or more nearby service centers and provide directions to such locations.

At step 255, it is determined what option the vehicle user has selected. If the vehicle user has opted to forego the opportunity to speak with a service center representative or a call center advisor, then the method terminates at step 260. If the vehicle user opts to speak with a service center representative, then the method proceeds to auxiliary step 265 wherein another routine may be invoked to place a call from the vehicle to a nearby service center. The auxiliary step 265 may include providing directions to the nearby service center using the previously described GPS capabilities of the system 100. Finally, if the vehicle user opts to speak with a call center advisor, then the method proceeds to auxiliary step 270 wherein another routine may be invoked to place a call from the vehicle to the call center 170.

Apart from the diagnostic and reporting method of FIG. 4, the system can also be programmed to periodically obtain updated voice messages from the call center 170 or other remote location to replace or supplement existing voice messages stored on the vehicle. This can be useful where it is desirable to change the content of a particular voice message or to provide voice messages for diagnostic trouble codes that previously had only a more generic associated voice message. The system can be programmed to periodically check for new voice messages or the web server 160, call center 170, or other remote location can initiate the downloading of new voice messages when they are available. Techniques and methods for carrying out the transfer of the voice messages as audio files is over the wireless system 140 and communication network 150 is known to those skilled in the art.

By using this method of using multi-tiered voice messages to provide not only information concerning a vehicle problem, but also corrective action based on the particular problem detected, the method provides an improved level of diagnostic reporting in a manner that minimizes the diversion of the driver's attention away from the road. The method further achieves this in a manner that reduces the reliance on live advisors which provides a plurality of advantages; namely, that it provides more standardized, reliable information to the driver while reducing the burden on call center personnel as well as reducing the amount of air-time used on the wireless carrier system, thereby providing a cost savings.

It is to be understood that the foregoing description is not a description of the invention itself, but of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, where two or more independent trouble codes are reported, the system can playback multiple voice messages sequentially. Also, rather than utilizing the first and second voice messages for a two-tiered reporting approach, the system can instead perform the more comprehensive diagnostic check upon initial request by the driver and then playback the appropriate instructional voice message without using the more generic first voice message. All such other embodiments, changes, and modifications are intended to come within the scope of the appended claims.

As used in this specification and claims, the terms "for example" and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

What is claimed is:

1. A diagnostic test and reporting method for a vehicle having an onboard diagnostic system, an instrument panel display containing at least one warning light or other visual indicator connected to the diagnostic system to provide a visual warning to a vehicle user, and a telematics unit that communicates with the diagnostic system and enables voice communication between the vehicle user and an advisor at a call center via a wireless connection, the method comprising the steps of:

(a) receiving a request for a vehicle diagnostic test from the vehicle user through a user interface of the telematics unit;

(b) determining whether a visual warning is present on the instrument panel display and, if so, accessing and playing a pre-recorded voice message that provides information concerning the visual warning;

(c) performing a vehicle diagnostic check of various vehicle conditions and generating diagnostic data resulting from the diagnostic check;

(d) accessing and playing a second pre-recorded voice message associated with the diagnostic data, the second voice message containing one or more instructions concerning corrective action to be taken by the vehicle user, (e) providing the vehicle user with an option to communicate with the advisor via voice communication over the wireless connection; and (f) initiating the wireless connection to the advisor if the user accepts the option;

wherein steps (a) through (e) are carried out at the vehicle without initiating any wireless connection to the call center.

2. The method of claim 1, further comprising the step of periodically obtaining additional pre-recorded voice messages from a remote location.

3. The method of claim 2, wherein said diagnostic system periodically checks for said additional pre-recorded voice messages from the remote location.

4. The method of claim 2, wherein said remote location initiates downloading of said additional pre-recorded voice messages when available.

5. A diagnostic system test and reporting method for a vehicle having an onboard diagnostic system and a telematics unit that communicates with the diagnostic system, the method comprising the steps of:

(a) receiving a request for a vehicle diagnostic test from a vehicle user through a user interface of the telematics unit;

(b) obtaining existing diagnostic status information from the diagnostic system in response to the request, wherein the exiting diagnostic status information relates to a check-engine light supplied by the vehicle to the vehicle user;

(c) accessing a pre-recorded voice message associated with the diagnostic status information, wherein the pre-recorded voice message comprises an informational message concerning the existing diagnostic status information; and (d) playing the pre-recorded voice message for the vehicle user; wherein steps (a)through (d) carried out at the vehicle without initiating a wireless communication from the vehicle to a remote device;

(e) performing a vehicle diagnostic check of various vehicle conditions and generating diagnostic data resulting from the diagnostic check;

(f) accessing a second pre-recorded voice message associated with the diagnostic data, the second voice message containing one or more instructions concerning corrective action to be taken by the vehicle user; and (g) playing the second pre-recorded voice message for the vehicle user.

6. The method of claim 5, further comprising the step of periodically obtaining additional pre-recorded voice messages from a remote location.

7. The method of claim 6, wherein said diagnostic system periodically checks for said additional pre-recorded voice messages from the remote location.

8. The method of claim 6, wherein said remote location initiates downloading of said additional pre-recorded voice messages when available.

9. The method of claim 5, wherein step (e) further comprises generating one or more diagnostic trouble codes in response to the diagnostic check, and step (f) further comprises accessing the second voice message using the diagnostic trouble code.

10. The method of claim 5, wherein step (b) further comprises performing a vehicle diagnostic check of various vehicle conditions and generating diagnostic information relating to the outcome of the diagnostic check, and wherein step (c) further comprises accessing a pre-recorded voice message containing one or more instructions concerning corrective action to be taken by the vehicle user.

11. The method of claim 5, further comprising the step of providing the vehicle user with an option to communicate with at least one of a call center or a service center.

12. The method of claim 5, further comprising the step of connecting the vehicle user with voice communication to a call center using a wireless communication device located on board the vehicle.

13. The method of claim 5, further comprising the step of connecting the vehicle user with voice communication to a vehicle service center using a mobile vehicle communications system.

14. The method of claim 5, further comprising the step of providing to the vehicle user directions to a nearby vehicle service center.

15. A diagnostic test and reporting method for a vehicle, the method comprising the steps of:

(a) receiving a request for a vehicle diagnostic test from a vehicle user through a user interface of the telematics unit;

(b) obtaining existing diagnostic status information in response to the request;

(c) accessing a first pre-recorded voice message associated with the existing diagnostic status information;

(d) playing the first pre-recorded voice message for the vehicle user;

(e) performing a diagnostic check of one or more vehicle system modules installed in the vehicle;

(f) accessing a second pre-recorded voice message based on a result of the diagnostic check; and (g) playing the second pre-recorded voice message for the vehicle user.

16. The method of claim 15, further comprising, after step (d), the step of informing the vehicle user via an audio message that the diagnostic check is being conducted.

* * * * *